Patented Apr. 9, 1940

2,196,367

UNITED STATES PATENT OFFICE 2,196,367

RESIN EMULSION

William J. Thackston, Haddon Heights, N. J., assignor to Röhm & Haas Company, Philadelphia, Pa.

No Drawing. Application December 15, 1937, Serial No. 179,865

5 Claims. (Cl. 260—29)

This invention relates to a process of preparing stable aqueous emulsions of reactive urea-formaldehyde condensation products of the organic solvent soluble type that are obtainable by condensing urea and formaldehyde or dimethylol urea in an alcoholic solvent.

The object of the invention is to provide stable emulsions of reactive urea-formaldehyde condensation products. A further object is to provide a process by which emulsions of this type can be prepared.

When urea and formaldehyde or their addition products, the methylol ureas, are condensed they pass through a series of stages that terminates in an insoluble, infusible, relatively inert, resinous mass. In the first stages of condensation, the reaction product is highly soluble in water. In later stages the water solubility gradually diminishes until water has at most only a slight swelling effect. When the point is reached at which the product no longer swells in water, condensation is substantially complete. In order to produce organic solvent soluble urea formaldehyde resins processes have been developed by which the condensation is carried out in the presence of an alcoholic solvent. Condensation products of this type when dissolved in paint and varnish solvents make excellent coating compositions.

It has now been found that solutions of these organic solvent soluble urea-formaldehyde condensation products while still in a very reactive stage are not affected by water and can be emulsified therein to give emulsions having a variety of technical applications for which neither the aqueous solutions nor organic solvent solutions are suitable.

The urea-formaldehyde condensates to which this principle can be applied are those organic solvent soluble condensates that are prepared in alcohols, preferably monohydric alcohols. These condensates are belived to be ethers of the partially condensed urea-formaldehyde reaction product in which the alcohol etherifies a number of the methylol groups before complete condensation takes place. Although they may be completely dehydrated they are still reactive and may be converted to the insoluble infusible state by heating under conditions that break the ether linkage. There are two ways by which they can be prepared. In one paraformaldehyde and urea, or their equivalent, dimethylol urea, are condensed in the presence of an acid catalyst and an anhydrous alcohol. This method is illustrated by the Lauter Patent 1,633,337, the Luther et al. Patent 2,019,865 granted November 5, 1935, and the Ludwig application Serial No. 95,845 filed August 13, 1936. Resins made in accordance with the method of this invention are preferred. The second procedure is illustrated by the Ludwig application Serial No. 139,919 filed April 30, 1937. In this process the urea-formaldehyde reaction is started in aqueous solution, thereafter dehydrated and the condensation continued slowly in an alcoholic solution. As is disclosed in the patents referred to, other anhydrous liquids can be used in place of alcohols but the product thus obtained is not as clear and stable a resin as are those made with alcohols.

These resins are normally marketed dissolved in the alcoholic solvent in which they are prepared. Preferably they are used in that state but if desired part of the solvent can be removed or it may be in part replaced with a different solvent such as toluene. Where the alcoholic solvent is partially soluble in water a sufficient excess should be present to insure that the resin is not thrown out of solution during emulsification or, in the alternative, the water used may be saturated with the partially soluble alcohol. When the resin is prepared in water soluble alcohols the uncombined alcohol should be replaced with a water immiscible solvent.

As emulsifying agent may be used ammoniacal casein, sulfonated oils such as Turkey red oil, water soluble cellulose ethers, long chain ammonium salts, particularly the long chain quaternary ammonium salts, Twitchell reagent, etc. The use of ammoniacal casein and similar alkaline reacting reagents are not recommended for their alkaline character interferes with the curing of the resin when applied and must be counteracted by the addition of acid. The water soluble cellulose ethers, particularly methyl cellulose, when used in sufficient quantity, give thick emulsions of excellent stability but they are somewhat difficult to dilute. When used in quantities such that a readily dilutable emulsion is obtained, the emulsion is stable in the concentrated form but settles rather quickly when diluted. The long chain quaternary ammonium salts were found suitable for dilute dispersions which however, were less stable than those obtained with methyl cellulose, but when attempts were made to obtain more concentrated ones the phases reversed to a water-in-oil type emulsion. The best emulsions however, were obtained by combining a water soluble cellulose ether, particularly methyl cellulose, with a long chain ammonium salt. This combination gave perfectly stable concentrated emulsions easily convertible to dilute emulsions that would not settle even after long standing. The unique emulsifying ability of this particular combination is an important feature of the invention.

In this combination the cellulose ether may be a water soluble methyl cellulose, ethyl cellulose, hydroxyethyl cellulose, or similar water soluble ether. The long chain ammonium salts are preferably the quaternary substituted ammonium salts in which one of the substituents contains a chain of more than nine carbon atoms, preferably sixteen or more, such as—

Dimethyl phenyl cetyl ammonium chloride
Dimethyl benzyl cetylammonium sulfate
Dimethyl benzyl oleyl ammonium chloride
Dimethyl benzyl lauryl ammonium chloride
Diethyl methallyl cetyl ammonium chloride
Diethyl benzyl lauryl ammonium phosphate
Dimethyl cetyl amine hydrochloride
Dimethyl benzyl cetyl ammonium acetate
Dimethyl benzyl cetyl ammonium oleate
Dimethyl benzyl cetyl ammonium stearate The cellulose ether can be used in amounts varying from 0.6 parts to 4 parts and the ammonium salts from 0.5 to 4 parts per 100 parts of resin. Greater quantities of ammonium salts may be used but without advantage. Very good results are obtained using 2 parts of methyl cellulose and 3 parts of ammonium salts to 100 parts of resin.

The emulsions can best be prepared by dissolving the emulsifying agent or agents in water and while agitating pouring in the solution of resin slowly until all is added and then continuing the agitation until emulsification is complete. When the combined emulsifying agent above mentioned is used the preferred procedure is to form a solution of the cellulose ether using only part of the total water, diluting it with additional water saturated if desirable with the alcohol in which the resin is dissolved, then adding a water solution of the long chain quaternary ammonium salt, and finally beating in the resin. Other processes can, of course, be used. It is frequently possible to add all the ingredients together and beat them into an emulsion although sometimes this results in a water-in-oil emulsion. Also, the emulsifying agent can be added to the resin instead of to the water. Instead of saturating the water used with the alcoholic solvent a sufficient excess may be added to the resin to provide for some passing into solution.

The following examples are given for purposes of illustration, it to be understood however, that the invention is not limited to them.

*Example 1.*—50 parts by weight of a 4% aqueous solution of methyl cellulose was diluted with 98 parts water saturated with butanol. 3 parts of dimethyl cetyl benzyl ammonium chloride dissolved in a mixture of three parts ethyl alcohol and 6 parts water were added with stirring. 100 parts of a urea-formaldehyde resin solution containing approximately 60% solids and made by condensing one mol of urea with two of paraformaldehyde in butanol solution using 0.1% of formic acid as condensing agent and reacted at the boiling point of the mixture with constant separation of water until approximately two mols of water were liberated, was slowly added while the mixture was being vigorously beaten so that the resin was emulsified as rapidly as it was run in. After all the resin was added beating was continued for an equal period to insure uniform and thorough emulsification.

The pH of the finished product was approximately 6.2–6.4 but a change to pH 8.0 by adding ammonia or to 5.0 by adding acetic acid had no apparent effect on the stability.

Variations in this example that can be made without modification of procedure are: replacing the methyl cellulose with a water soluble ethyl or hydroxyethyl ether of α-cellulose made by the process of the Powers, Bock and Houck application Serial No. 750,128 filed October 26, 1934, now Patent No. 2,087,549 granted July 20, 1937; replacing of dimethyl cetyl benzyl ammonium chloride with any of the other quaternary ammonium salts heretofore mentioned, and using a plasticized resin consisting for example, of 80 parts urea formaldehyde resin and 20 parts glycerol-sebacic acid-castor oil resin. By a similar procedure emulsions may be made using other emulsifying agents as, for example, those heretofore mentioned.

The emulsions thus prepared have a variety of applications in industrial processes. They may be used in the preparation of emulsion paints for they dry down to a continuous film. Or, as disclosed in copending application Serial No. 155,216 filed July 23, 1937, may be used for producing a variety of effects in the finishing of textiles. They may likewise be used in coating paper and other porous materials, such as composition board and leather. They may be readily pigmented or mixed with color lakes and dyes to produce colored coatings. By dissolving water soluble dyes or dispersing water insoluble dyes in the emulsion the individual particles of resin can be colored.

The emulsions herein disclosed may also be blended with emulsions of other film forming materials such as emulsions of cellulose derivatives, of oil modified alkyd resins, of acrylic and methacrylic ester polymers, and of other synthetic resins, thereby imparting to the films deposited from those emulsions, to a greater or less degree depending upon the proportions used, the distinctive characteristics of the urea-formaldehyde resins.

In utilizing the herein disclosed emulsions as film forming compositions, they are applied by any of conventional methods such as spraying, brushing, spreading or in the treatment of flexible materials by padding the material through the emulsion. The layer thus deposited dries down to a continuous film by evaporation of water and the organic solvent. The resin may then be converted to the insoluble infusible state by baking. To accelerate the final hardening it is desirable to treat the dried film prior to baking with an acid condensing agent or in the alternative, to add a potentially acid condensing agent such as an ammonium salt of phosphoric acid to the emulsion.

Modifications of the invention will be obvious to those skilled in the art. Insofar as such modifications utilize the principles herein disclosed, it is intended that they shall be covered by the claims.

I claim:

1. A stable, aqueous emulsion, dilutible with water, the internal phase of which consists essentially of a water-insoluble, organic solvent-soluble urea-formaldehyde-alcohol condensate dissolved in a substantially water-immiscible alcohol, the solution of said condensate being emulsified with a water-soluble cellulose ether and an ammonium salt, substituted by an aliphatic group of at least ten carbon atoms.

2. A stable, aqueous emulsion, dilutible with water, the internal phase of which consists of a water-insoluble, organic solvent-soluble ureaformaldehyde-monohydric alcohol condensate dissolved in a substantially water-immiscible monohydric alcohol, 100 parts of the solution of said condensate being emulsified with between 0.6 and 4 parts of a water-soluble cellulose ether and between 0.5 and 4 parts of a substituted ammonium salt having an aliphatic chain of at least ten carbon atoms.

3. A stable, aqueous emulsion, dilutible with water, the internal phase of which consists of a water-insoluble, organic solvent-soluble urea-formaldehyde-butanol condensate dissolved in butanol, 100 parts of the solution of said condensate being emulsified with between 0.6 and 4 parts of a water-soluble methyl cellulose and between 0.5 and 4 parts of dimethylcetylbenzyl ammonium chloride.

4. The process of preparing a stable, aqueous emulsion, dilutible with water, of a water-insoluble, organic solvent-soluble urea-formaldehyde-alcohol condensate dissolved in a substantially water-immiscible alcohol, which comprises dispersing the alcoholic solution of said condensate in an aqueous solution of a water-soluble cellulose ether and a long chain substituted ammonium salt.

5. The process of preparing a stable, aqueous emulsion, dilutible with water, of a water-insoluble organic solvent-soluble urea-formaldehyde-butanol condensate dissolved in butanol, which comprises dispersing 100 parts of the solution of said condensate in an aqueous solution containing between 0.6 and 4 parts of water-soluble methyl cellulose and 0.5 and 4 parts of a quaternary ammonium salt having an aliphatic chain of at least ten carbon atoms.

WILLIAM J. THACKSTON.